US010716435B2

(12) United States Patent
Drozd et al.

(10) Patent No.: US 10,716,435 B2
(45) Date of Patent: Jul. 21, 2020

(54) PROCESSING AND PACKAGING OF FOOD PRODUCTS

(75) Inventors: James Michael Drozd, Raleigh, NC (US); Michael Druga, Raleigh, NC (US)

(73) Assignee: HBC Holding Company, LLC, Raleigh, NC (US)

( * ) Notice: Subject to any disclaimer, the term of this patent is extended or adjusted under 35 U.S.C. 154(b) by 681 days.

(21) Appl. No.: 14/364,019

(22) PCT Filed: Dec. 7, 2011

(86) PCT No.: PCT/US2011/063814
§ 371 (c)(1),
(2), (4) Date: Jun. 9, 2014

(87) PCT Pub. No.: WO2013/085508
PCT Pub. Date: Jun. 13, 2013

(65) Prior Publication Data
US 2014/0322403 A1  Oct. 30, 2014

(51) Int. Cl.
*A47J 44/00* (2006.01)
*A23L 3/005* (2006.01)
(Continued)

(52) U.S. Cl.
CPC .............. *A47J 44/00* (2013.01); *A23B 7/01* (2013.01); *A23L 3/005* (2013.01); *A23L 3/01* (2013.01); *B65D 75/00* (2013.01); *B65D 85/34* (2013.01)

(58) Field of Classification Search
CPC .......... A23L 1/025; A23L 1/0255; A23L 3/36; A23L 3/005; A23L 3/01; A23B 7/04; A23B 7/01
See application file for complete search history.

(56) References Cited

U.S. PATENT DOCUMENTS 2,503,695 A * 4/1950 Webb .................. A23L 2/12
426/384
4,896,005 A  1/1990 Skubich
(Continued)

FOREIGN PATENT DOCUMENTS

EP  1719418 A2  11/2006
GB  2098040 A  11/1982
(Continued)

OTHER PUBLICATIONS

PCT International Searching Authority, International Search Report and Written Opinion for PCT/US2011/083814 dated Mar. 27, 2015, 19 pages.
(Continued)

*Primary Examiner* — Erik Kashnikow
*Assistant Examiner* — Lela S. Williams
(74) *Attorney, Agent, or Firm* — Myers Bigel, P.A.

(57) ABSTRACT

Methods and systems for processing foods includes providing a flexible package. A pre-processed food product (e.g., raw food) is provided and is processed by rapidly heating the food product. This processed food product is delivered into the flexible package for consumption by a user. Additionally, in other embodiments, methods and systems for processing frozen food products to shelf stable or refrigerated products are provided. A frozen food product is provided, converted to a pumpable state, and then processed by rapidly heating the food product. This processed food product is then delivered into a package.

18 Claims, 7 Drawing Sheets

(51) Int. Cl.
*A23L 3/01* (2006.01)
*A23B 7/01* (2006.01)
*B65D 85/34* (2006.01)
*B65D 75/00* (2006.01)

(56) References Cited

U.S. PATENT DOCUMENTS

| | | | |
|---|---|---|---|
| 5,976,592 A | 11/1999 | Polato | |
| 2004/0255794 A1 | 12/2004 | Hoshino | |
| 2006/0151533 A1* | 7/2006 | Simunovic | A23B 7/01 222/150 |
| 2007/0292587 A1* | 12/2007 | Maddens | A23L 1/40 426/589 |
| 2010/0037784 A1 | 2/2010 | Polato | |
| 2011/0159157 A1* | 6/2011 | De Rocco | A23B 7/148 426/126 |
| 2011/0287151 A1 | 11/2011 | Simunovic | |

FOREIGN PATENT DOCUMENTS

| | | | |
|---|---|---|---|
| JP | 2000166464 | * | 6/2000 |
| WO | WO2009063309 | * | 5/2009 |
| WO | 2010/023701 A1 | | 3/2010 |
| WO | 2010/039466 A2 | | 4/2010 |
| WO | WO/2012/160483 | * | 5/2012 |

OTHER PUBLICATIONS

European Patent Office, Supplemental European Search Report for Application No. 11 87 7020 dated Aug. 25, 2016, 9 pages.
Canadian Office Action corresponding to Canadian Patent Application No. 2,858,529 dated Jul. 27, 2018. (4 pages).
Communication Pursuant to Article 94(3) EPC corresponding to European Patent Application No. 11877020.5 dated Jul. 25, 2018. (3 pages).
Communication pursuant to Article 94(3) EPC corresponding to European Patent Application No. 11877020.5 dated Mar. 1, 2018. (4 pages).
Canadian Office Action corresponding to Canadian Patent Application No. 2,858,529 dated Oct. 24, 2017. (4 pages).
Communication pursuant to Article 94(3) EPC corresponding to European Patent Application No. 11877020.5 dated May 31, 2017. (5 pages).

* cited by examiner

PROCESSING AND PACKAGING OF FOOD PRODUCTS

BACKGROUND

People enjoy eating various foods for the taste, nutrients, etc. These foods are packaged to be preserved for on-the-go convenience, shipping and storage efficiency, and other reasons. Packaging of some foods (e.g., particulate containing foods) is primarily in hard packages, such as jars or cans. The processing of such foods sometimes overcooks, cooks out the nutrients of the foods and/or destroys the tastes of the food. Additionally, accessing the contents of such packaging can cause a negative consumer experience. For example, the packaging may be a can which requires a can opener. Additionally, some people won't eat canned or jarred foods because the taste of the food is degraded, preservatives must be added or that the foods have lost their nutrient value.

SUMMARY

Embodiments of the present invention are directed to methods, products and systems for processing food and/or other materials that may address the above issues. In accordance with embodiments, a method for processing foods includes providing a flexible package. A pre-processed food product (e.g., raw food) is provided and is processed by rapidly heating the food product. This processed food product is delivered into the flexible package for consumption by a user.

Additionally, some other embodiments of the present invention are directed to methods and systems for processing frozen food and/or other materials. In accordance with embodiments, a method for processing frozen food products to shelf stable or refrigerated products is provided. A frozen food product is provided, converted to a pumpable state, and then processed by rapidly heating the food product. This processed food product is then delivered into a package.

In some embodiments, the pre-processed food product comprises food pieces or particulates. The pre-processed food product could be fruit, vegetable, protein, dairy-based, and/or any other consumable food. The food pieces or particulates could be in the form of a puree, a particulate, or a combination thereof.

In some embodiments, the pre-processed food product comprises at least one nutraceutical. Examples of nutraceutical products may include quercetin, anti-oxidants, lycopene, phenolics, beta-carotene, Vitamin C, probiotics or any other nutrient-containing material.

In some embodiments, the pre-processed food is rapidly heated. The rapid heating process would increase the temperature of the pre-processed food product to a pre-determined temperature.

In accordance with some embodiments, a processed product includes a flexible package and a particulate food contained within the flexible package. In one embodiment, the flexible package contains less than 8 ounces of food product. In an embodiment, the package can be squeezed to remove the food product in the package.

In accordance with some embodiments, a product includes a flexible package and vegetable, fruit, protein, dairy-based or combination thereof contained within the flexible package, the vegetable or fruit comprising added nutraceutical products.

DETAILED DESCRIPTION

The present invention is described below with reference to flowchart illustrations and/or block diagrams of methods, apparatus (systems) and food products according to embodiments of the invention. It will be understood that each block of the flowchart illustrations and/or block diagrams, and combinations of blocks in the flowchart illustrations and/or block diagrams, can be implemented by elements of the system. The blocks of the flow chart can be performed at any order and should not be limited to the specific order described herein.

Food Processing and Packaging

Described herein is a method 100 and system 200 for processing food products or other materials according to some embodiments to produce food products 300.

Figure 1:
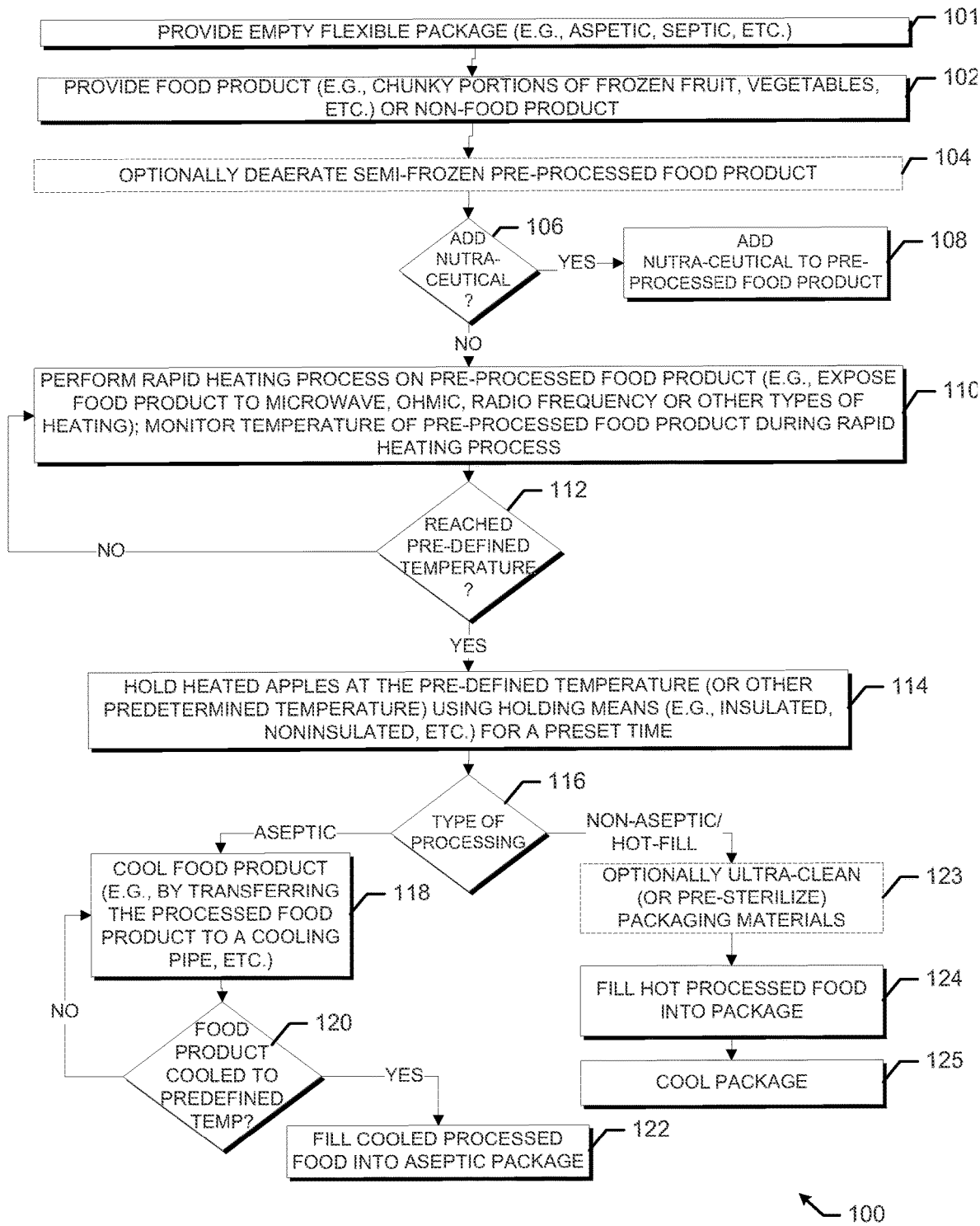
FIG. 1 is a flow chart of an example of a method to process food or other materials in accordance with some embodiments of the present invention.

Referring first to FIG. 1, in block 101, a package is provided that will hold a sterilized food product. In one embodiment, this package could be aseptic, meaning it is substantially sterilized prior to adding the food product. As referred to herein, according to some embodiments, aseptic packaging means packaging sterilized to approximately a 5 log reduction.

In another embodiment, the package may initially not be aseptic or may be non-sterile. In such embodiments, the packaging would initially have a sterility of less than one log reduction for most bacterias and yeast and a pre-sterilization process (called ultra-clean process) would be used to partially sterilize the packaging to a certain level, such as a three log reduction, two log reduction or a one log reduction for most bacterias and yeast. This will be discussed in more depth later.

Regardless, the package could be flexible in that to obtain the contents of the packaging, the packaging is squeezed to deform the sides of the packaging forcing the contents of the interior of the packaging out of the packaging. In an embodiment, the package is flexible and can contain less than 8 ounces of food product and greater than 1 ounce of food product. In one embodiment, the package contains around 3.2 ounces of food product. In some embodiments, the package can be squeezed to allow the food product to be consumed. In some embodiments, the package has a spout.

In block 102, a pre-processed food product is provided to a food processing system 200. This pre-processed food product could be fruit, vegetable, protein, dairy-based, and/ or any consumable food product, or any combination. This pre-processed food product could be a puree, a particulate, or a combination thereof, such that the pre-processed food is "chunky" or has chunks. As used herein, the term "particulates," "chunky" or "chunks" means that at least a portion that has solid portions among other solid portions or among a puree such that the solid portions are detectable by a human, according to some embodiments. When the pre-processed food product includes particulates, the pre-processed food product contains food pieces that may be larger than 1/16" in cross-sectional diameter. In an embodiment, the pre-processed food product contains a mixture of 1/8-1/2" pieces of fruit, vegetable, protein, and/or dairy based and fruit, vegetable protein, and/or dairy-based puree.

It is should be understood that the present invention need not be food and can also be applicable to non-food products.

The food product may be converted into a pumpable state. There are at least two ways to convert the frozen food product to a pumpable state. In a first embodiment, the food product may be converted into a pumpable state by using a mechanical process to slice, smash, or chop the food product (or perform some other process that will facilitate pumping of the food product, including making the food product into smaller pieces). At this point, the food may be granular pieces having a size that allows the granular pieces to be pumped through a tube. In one embodiment, the granular pieces have a diameter of about 1 cm, 1 mm or other diameter which would allow the granular pieces to be pumped in a pipe having a diameter of about one inch to three inches.

In a second embodiment, the food product may be converted into a pumpable state by adding one or more liquid carriers to the food product. The introduction of liquid carriers allows at least portions of the food product to reach a melting temperature or allows the food product to travel along with a pumpable substance which will act as a lubricant when the food product travels along or through a pipe (or other transfer system). The pumpable state allows the food product to be pumped into the pipes (or other transfer means) of the system.

Under block 104, as an optional step for processing oxygen sensitive foods such as fruits the product may undergo a deaeration step immediately prior to the rapid heating process. Either way, the product would then go to the rapid heating stage (discussed below) to become sterilized once the air has been removed. The deaerator is a vessel that the product flows through under a vacuum to remove the air from the product.

For the deaerator, there is a vacuum pump attached to the vessel (or transfer system) where the food product flows through with level sensors that keep a certain level of food product in the vessel while the deaerator pulls the vacuum from the top of the vessel. Controls work to regulate the product pumps based on level sensing as well as the vacuum pump based on the air pressure. The food product comes in from the top and hits a plate that the food product flows over to break up air bubbles therein and then the food product flows out of the bottom of the deaerator portion of the transfer system.

Aroma recovery is an optional addition to the deaeration system. When one pulls the air out of the food product (especially at higher temperatures) some of the flavors are pulled off of the food product in the air. Some of the deaeration systems run the effluent air through a condenser to turn that 'aroma' back into a liquid form. Once it is liquid one can either 1) extract the air, concentrate the air to form an aromatic liquid, and store such aromatic liquid (to sell later) as a natural flavor in one embodiment, or 2) in another embodiment, one could inject such aromatic liquid back into the product at a later point in the process to ensure that the processed food product maintains all of its original flavor.

The deaeration system reduces the oxygen content in the food product inside the package which increases shelf life as well as nutrient retention and flavor and color retention.

It should be noted that the deaeration system and process (as like some steps in method 100) may be optional, as depicted in FIG. 1 by dashed lines In block 106, a determination may be made as to whether a nutraceutical product should be added to the pre-processed food product. The nutraceutical product may be added prior to rapid heating. Examples of nutraceutical products may include quercetin, anti-oxidants, Vitamin C, probiotics, phenolics, lycopene, beta-carotene or any other nutrient-containing material. If lower exit temperature rapid heating is used, it may be possible to introduce probiotics.

In block 108, if one or more nutraceutical products are desired to be added to the pre-processed food product, a blending step is used to mix the one or more nutraceutical products with the pre-processed food products. At this point, the pre-processed food product includes one or more of the nutraceutical products.

In block 110, the pre-processed food product is rapidly heated. The rapid heating process increases the temperature of the pre-processed food product to a pre-determined temperature rapidly possibly via a volumetric heating process. The temperature of the food product during the repaid heating may be monitored to ensure that the pre-processed food product reaches the pre-determined temperature. The pre-processed food product may be heated to the pre-determined temperature in a short duration of time. In an embodiment, the time the pre-processed food product is exposed to the rapid heating process may be less than about 4 minutes. In an embodiment, the time the pre-processed food product is exposed to the rapid heating process may be less than about 2 minutes. In an embodiment, the time the pre-processed food product is exposed to the rapid heating process may be less than about 1 minute.

As mentioned above, the rapid heating process may use a volumetric heating process via a rapid heating device which could be a device that delivers electromagnetic energy (e.g., microwave energy, radio frequency energy, ohmic energy and/or other forms of volumetric heating) to the pre-processed food product (e.g., a microwave device connected to a microwave generator so that microwave energy is focused into the pre-processed food product from the microwave generator). The rapid heating system is discussed in more depth later with regard to FIG. 2.

The pre-processed food product may be heated in a relatively short duration of time (e.g., less than or equal to 4 minutes). In an embodiment, the time the pre-processed food product is directly exposed to the rapid heating process so that the pre-processed food product is heated to the pre-determined temperature may be less than or equal to about 3 minutes or about 2 minutes. In another embodiment, the time is less than or equal to 1 minute.

As stated above, the pre-processed food products are heated to a predetermined temperature. This predetermined temperature may be preset or predetermined by the operator of the system such that the food product reaches such temperature and the system does not substantially heat the food product above such predefined temperature. According to one embodiment, this predetermined temperature generally relates to a temperature that a regulatory agency requires for a food product so that the food product is suitable for consumption. For example, for food that has a pH of about 3.5 pH, the predetermined temperature required may be 95° C. for less than one minute or 85° C. for less than 10 minutes.

According to another embodiment, the predetermined temperature relates to a temperature that is somewhat greater than the temperature that a regulatory agency requires for a food product so that the food product is fit for consumption. For example, using the above example, if the regulatory agency requires a food product to be heated to 95° C. for one minute, the predetermined temperature may be 100° C. or 110° C. (i.e., a temperature greater than 95° C.) such that a temperature measured at the end of one of the steps of methods 100 or 200 (e.g., after block 114 of FIG. 1, which is after rapid heating) is 95° C. or greater.

High acid products, i.e. pre-processed food products with high acidity, or a product with a pH less than about 4.6, may be heated to 70° C. or above for proper processing. Once the pre-processed food product has reached this temperature, the pre-processed food product may be either placed into packaging or cooled, as will be discussed later. In one embodiment, the pre-determined temperature to heat the high acid products would be about 85 C to 100 C. This is true for products that do not need refrigeration after packaging and can be stored on a shelf at a store when the product is being sold. However, for high-acid products where the pre-determined temperature to heat the high acid products (or other food products) would be about 60° C. to 70° C. These products would need to be refrigerated at the store and have a defined shelf life so that the food product would not spoil in the packaging.

Lower acid products, or a product with a pH greater than or equal about 4.6, may be heated above 100° C. In some embodiments, the lower acid products are heated to about 120° C. to 140° C. (or about 100° C.-110° C. for lower acid products which would require refrigeration at the store later to preserve the contents of the packaging). The pre-processed food product would enter the rapid heating system 208 at refrigerated, ambient, or pre-heated temperatures. In some embodiments, the pre-processed food product enters the rapid heating system 208 between about 10° C. and 25° C. In some embodiments, the pre-processed food may be pre-heated prior to entering the system and may enter the rapid system at about 40° C. to 75° C.

For the pre-determined temperature, the food product exiting the rapid heating process would have minimal variation in temperature. In an embodiment, the food product exiting the rapid heating process would not vary more than +/−20° C. around the pre-determined temperature for lower acid products and +/−15° C. around the pre-determined temperature for high acid products. This maximum variation in temperature includes any point in the food product, including the temperature at the center of any pieces of fruit, vegetable, protein, dairy-based, and/or any consumable food in the food product.

This rapid heating may inactive enzymes that cause spoilage and destroy some or all of the pathogens that lead to spoilage and unsafe foods. The rapid heat process could use microwaves, radio frequency, ohmic and/or other forms of volumetric heating, as is discussed with regard to FIG. 2 later.

Because the rapid heating process uses electromagnetic energy, the food product can be rapidly heated to the predetermined temperature and held at this predetermined temperature for a relatively short period of time as compared with thermal heating systems. As used herein, the term "critical zone" for processing fruits relates to the temperature range where accelerated degradation occurs to the product quality and nutrients. For fruits, one should inactivate the native enzymes (which degrade the anthocyanins and other phenolic antioxidants in the fruits) as soon as possible, and then lower the food product's temperature out of their optimal activity temperature range (which may be substantially the above-discussed predetermined temperature). Once a fruit has been ground or sliced this degradation accelerates rapidly as the fruits' individual cells rupture and thereby releasing enzymes contained in the fruit. The critical zone for fruits is typically between 40° C. and 70° C. according to some embodiments. Above 70° C., the process will have killed the spoilage microorganisms and completely inactivated all product degrading enzymes, but will continue degrading nutrients thermally until the product is cooled. One should minimize the time above this temperature range as well to minimize thermal degradation but less critical once the enzymes have been inactivated. Electromagnetic devices used in the rapid heating process accomplish these goals due to the quick heating of the food product as opposed to current thermal heating systems.

As briefly mentioned above, the temperature of the food product is monitored while being rapidly and volumetrically heated. Such monitoring may be performed using a temperature sensor. The monitored temperature is fed back into the system and when the system determines that the food product has reached the predefined temperature, the system stops substantially heating the food product so that the temperature of food product does not continue to increase (or the food product temperature is held constant).

In block 112, a determination may be made as to whether the food product has reached the pre-determined temperature in the rapid heating process. The temperature may be monitored to determine that the pre-determined temperature has been reached. A control system is used to control the rapid heating process that may integrate feedback from the monitored temperature.

In block 114, the food product exiting the rapid heating system may need to be held at or near the exit temperature for a pre-determined length of time, where the exit temperature being the temperature of the food product at the moment of exiting the rapid heating system. This occurs in the food product temperature holding system. The temperature holding system may be insulated pipes or other means for holding the food product temperature for a predetermined time. The amount of time that the food product temperature is kept constant is relatively short. In an embodiment, the time the pre-processed food product is contained in the holding system may be less than about 2 minutes. In another embodiment, the time in the holding system is less than 1 minute. In some embodiments, the temperature being held in the food holding system would be for aseptic processing. In some embodiments, the hot-fill process (discussed later) does not need to be paced in the food product temperature holding system prior to being placed into the package.

In block 116, a determination may be made the type of package to receive the processed food product. Either the food product will be placed into aseptic packaging or will be hot-filled into the packaging according to an embodiment. As used herein, the term "hot-filling" or "hot-fill" means filling the packaging while the food product temperature is still substantially at the above-discussed predefined temperature (or other temperature exiting the rapid heating process just after block 112), according to some embodiments. In this regard, the hot-fill process means filling packaging (e.g., ultra-clean packaging) with the food product directly after the rapid heating by the electromagnetic energy, according to an embodiment. The aseptic process (as represented by blocks 118 and 120 and discussed more below) includes filling the package with food product after the package has been sterilized via an aseptic process. As previously mentioned, the package may be sterilized to 5 log reduction or higher to be sterilized, as used herein in some embodiments. The package may be flexible or the package may be ridged.

In block 118, if aseptic processing or aseptic packaging (e.g., packaging that has been substantially sterilized to 5 log reduction or more) is desired, the food product is cooled in the food product cooling system. This food product cooling system may be a heat exchanger such as a pipe in a cooling tube, shell in tube, and/or triple tube heat exchangers. Transfer of thermal heat occurs from the food product through the transfer system to the cooling system so that the temperature of the food product is more rapidly cooled than if the cooling system was not present. In one embodiment, the cooling system includes a cooling tube surrounding the transfer system (or pipe) and the cooling tube has cool water running therethrough to pull heat from the food product in the transfer system.

The cooling time is relatively short. Initial cooling happens relatively quickly because of the difference in temperature between the cooling source and the food product. This initial rapid cooling allows the product to be out of the critical zone quickly. In an embodiment, the time the pre-processed food product is in the food product cooling system may be less than about 20 minutes. In an embodiment, the time in the food product cooling system is less than about 7 minutes.

In block 120, a determination is made whether the product is sufficiently cooled for aseptic packaging. The temperature of the food product may be monitored while the food product is being cooled in the cooling system to determine that the product is sufficiently cooled for aseptic packaging. A control system may be used to manage, monitor, and control the cooling process. In some embodiments, the food product is cooled to below 30° C. prior to being transferred to the aseptic packaging.

In block 122, the processed food product is filled into a flexible package after the desired cooling temperature of the food product is reached. The flexible package could have been sterilized using aseptic techniques during the processing of the food product. The package is described above with regard in block 102.

If the decision in decision block 116 is that the hot fill process is to be used, the method 100 may continue to block 123 or 124. As used herein, the term "hot-fill" process refers to blocks 124 and relates to filling packaging while the processed food product is at the predetermined temperature of block 108 (e.g., the temperature that the food product exits the rapid heating process), according to an embodiment. This allows for a package that is not aseptic (e.g., a partially sterilized package) to be used, such as packaging which is sterilized only to one log reduction, two log reduction, three log reduction, less than one log reduction or otherwise less than an aseptic package. Since the processed food product is at hot temperature at the exit of the rapid heating process (i.e., just after block 112), the filling of the packaging while the food product is hot kills most micro-organisms (i.e. bacteria, yeasts, molds) in the packaging due to the fact that such micro-organisms die or are eliminated or destroyed at such temperature.

In block 123, as an optional step in the hot fill process, the packaging materials may be pre-sterilized using ultraviolet ("UV") radiation and/or peroxide steam (or other means). The packaging materials that are to be pre-sterilized may include a film (e.g., the walls of the packaging) used to produce a flexible pouch of the packaging as well as a plastic fitment of the packaging that is used for consuming the product. This process is referred to herein as "ultra-clean" which refers to using UV radiation to at least partially sterilize the film (or walls) of the packaging and also make sure the environment surrounding the partially-sterilized package is clean such that the air does not contain pathogens, bacteria, etc. which would contaminate the partially-sterilized package. The ultra-clean process of block 123 would be done under a controlled air flow environment with sterile air filtration (usually HEPA filtered) to prevent any recontamination of the packaging once sterilized. Once the package is pre-sterilized, it should remain in the sterile air environment until it is filled with the processed food product and the packaging is directly sealed thereafter.

The ultra-clean process of block 123 may be considered to be "ultra-clean" but not quite aseptic. An ultra-cleaned package is less sterile than aseptic packaging but still achieving a relative sterility of the packaging. The machines for creating aseptic packaging have a much more controlled atmosphere during filling and sterilize the packaging to a higher degree (greater log reduction) of sterility as mentioned above. In one embodiment, the difference between aseptic and ultraclean is a matter of the level of sterility of the packaging, whereas "ultra-clean" is sterilized to 1 log reduction while aseptic is sterilized to approximately 5 log reduction, according to one embodiment.

In aseptic packaging, one would fill the processed food product when the processed food product reaches an ambient temperature such that the processed food product will not sterilize the package (because the processed food product is not at a temperature which will kill bacteria, deactivate enzymes, etc.) which means one has to be sure the package is sterilized by the filler. In ultraclean processing, one sterilizes the package to a degree but the hot processed food product serves to substantially sterilize the package to the degree needed.

By adding the ultra-clean step 123 to method 100 subsequent to the holding step in block 110, with the product at an elevated temperature, may be reduced in duration. Because the food product is not kept at a high temperature for a long duration (using electromagnetic systems as compared with the longer durations required by thermal heating systems), this preserves the quality and retains the nutrients of the food product. Additionally, the natural flavors of the food product are also preserved. After the holding step, the hot-filled package would then go into the cooling step 122 as already indicated.

It should be understood that block 123 is optional, as indicated by the dashed lines. As such, method 100 may proceed directly from block 118 to block 124 instead of performing block 123.

Regardless, blocks 123 or 124 are performed immediately and automatically in response to block 114 (or immediately after method 100 proceeding past block 112), according to some embodiments.

In block 124, if it is determined that the food product will be hot-filled, the food product is filled into a package (either an aseptic package or hot-fill package) hot (e.g., at the predetermined temperature discussed above). The package may be filled with the food product a pre-determined amount in direct response to and after exiting the rapid heating process. The food product may not be exposed to the cooling system, but instead may be directly filled into the package from the rapid heating process. Once the desired amount of food product has been filled into the package, the package is sealed.

Optionally, after the package is hot-filled in block 124, the package with the hot-filled, processed food product may be held such that the hot-filled, processed food product will remain at a high temperature (e.g., the temperature of the hot-filled, processed food product is not reduced by any cooling system) for a preset time period, such as 30 seconds. For example, after the package is filled with hot-filled, processed food product, the hot-filled package is then placed on a conveyor or other location prior to being cooled so that the hot-filled, processed food product in the package will remain at or close to the predetermined temperature for a preset time duration. This may be necessary for regulatory verification processes to verify that the hot-filled, processed food product has reached a certain temperature for a pre-defined time period.

In block 125, the package containing the hot food product may be cooled. Cooling of the package may occur until a desired temperature of the processed food product in the packaging is reached. In one embodiment, the hot-filled package may be sealed and then placed into a cooling water bath which extracts thermal energy from the food product in the package. A control system may be used to control the cooling process of the packaging and the temperature. In some embodiments, the package containing the hot food product is cooled to below 35° C. from the predetermined temperature.

The processed food product (which is delivering into the flexible packaging) includes particulates of the food product (e.g., food pieces and/or chunks). As such the flexible packaging includes chunks of food and is processed using the above-described rapid electromagnetic rapid heating procedure.

Figure 2:
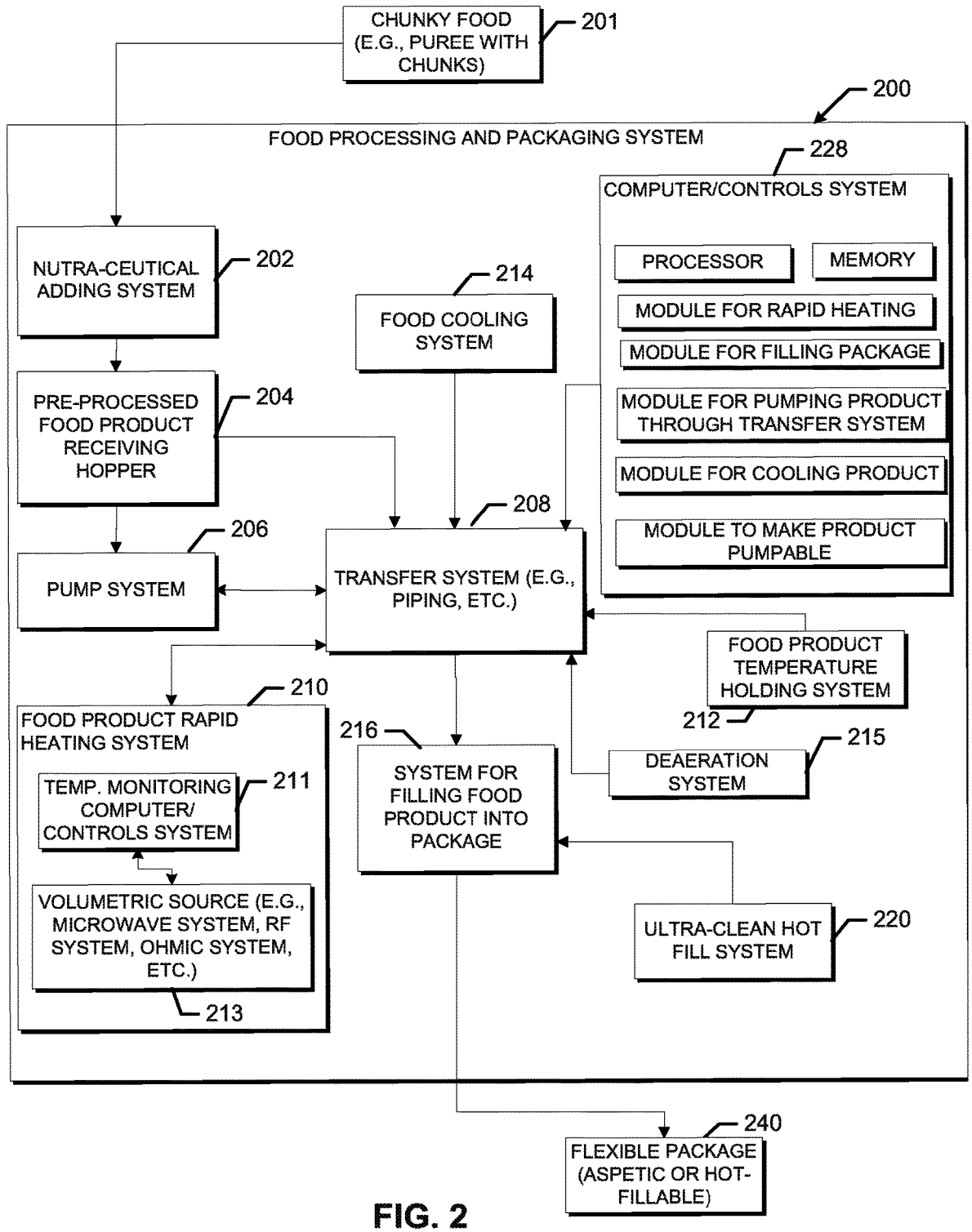
FIG. 2 is a block schematic diagram of an exemplary system of processing food or other materials in accordance with an embodiment of the present invention.

FIG. 2 is a block schematic diagram of an exemplary system 200 of converting food products to shelf stable or refrigerated food products in accordance with some embodiments of the present invention. A food product 201 is provided to the system 200.

At least one nutraceutical may be added to the pre-processed food product if desired. This may occur using a nutraceutical adding system 202. At this point, the pre-processed food product would include one or more of the nutraceutical products.

The pre-processed food product may be added to a receiving hopper 204 or any other container. The receiving hopper 204 holds the incoming pre-processed food until it is pumped into the system. The receiving hopper 204 assures that the system has enough pre-processed food product to be pumped in the system so that there are minimal or no gaps in food product provided to the system during operation, according to some embodiments.

A pump system 206 is connected to the receiving hopper 204 and may be used to convey the food product throughout the system 200. The pump system 206 may receive pre-processed food product from the hopper and provide means for pumping the food product throughout the system 200. The pump system 206 may be interconnected to a transfer system 208 allowing the pump system 206 to pump the food products through the transfer system 208.

The transfer system 208 is used to interconnect the various systems, including the pump system 206, for processing. The transfer system 208 may be a system of interconnected pipes that connect one or more of the systems together, such as the pump system 206, the receiving hopper 204, the heating and cooling systems 210, 214, the filling system 216, etc. The transfer system 208 may allow for the food product to easily transition from one of the various systems to another within the processing system. The transfer system 208 may be a system of pipes that are substantially hollow but allow for a pumpable substance to be pumped therethrough.

A rapid heating system 210 is thermally and/or electrically communicative with the transfer system 208 and would increase the temperature of the pre-processed food product in the transfer system 208 to a pre-determined temperature, whereas the pre-determined temperature is discussed above. The temperature of the food product may be monitored to ensure that the pre-processed food product reaches the pre-determined temperature. A computer system 228 (which is discussed below) could be used to control the temperature exiting the rapid heating system 210. The pre-processed food product may be heated to the pre-determined temperature in a short duration of time, as previously discussed.

As stated above, at least a portion, or all, of the pre-processed food product enters the rapid heating system 210. In some embodiments, the pre-processed food product enters the rapid heating system 210 in pumpable form, as discussed above. In some embodiments, the pre-processed food may be pre-heated prior to entering the rapid heating system 210, as stated above.

The rapid heating system 210 may include a volumetric source 213. The volumetric source 213 may be a system that delivers electromagnetic energy to the pre-processed food product from an electromagnetic energy generating source. For example, the volumetric source may be a microwave generator that generates and transfers microwave energy into the pre-processed food product from the microwave generator until the food product is heated to the above-discussed predetermined temperature. Alternatively, or additionally, the volumetric source 213 may be 1) a radio frequency ("RF") energy generator that delivers RF energy to the food product until the food product is heated to the above-discussed predetermined temperature, 2) an ohmic energy generator that delivers ohmic energy to the food product until the food product or food product is heated to the above-discussed predetermined temperature, and/or 3) other forms of volumetric or electromagnetic heating. The electromagnetic source delivers electromagnetic energy to the food product which allows for even and quick heating of the food product as opposed to thermal heating which requires heating from the outside of the food product first and heating the inside of the food product last. It should be understood that a volumetric source 213 need not be required to be an electromagnetic source and could be any other source which rapidly heats the food product in a duration of time similar to or faster than the above-mentioned electromagnetic sources.

The rapid heating system 210 also may include a temperature monitoring computer/controls system 211 which manages the volumetric source 213 for delivering electric (e.g., microwave, ohmic RF, etc.) energy to the (or semi-frozen) food product. For example, the temperature monitoring computer/controls system 211 controls the volumetric source 213 to turn it on and off for delivering energy to the food product in the transfer system 208. Additionally, the temperature monitoring computer/controls system 211 monitors the temperature of the (semi-frozen) food product while it is being heated by the volumetric source 213. When the food product is heated to the predetermined temperature, the temperature monitoring computer/controls system 211 adjusts the volumetric source 213 (or decreases the power thereof) so that the food product is not heated above such predetermined temperature.

A temperature holding system 212 may be employed to hold the temperature of the food product at or near the exit temperature for a pre-determined length of time, wherein such exit temperature is the temperature of the food product at the moment of exiting the holding system 212 or rapid heating system 212. In one embodiment, according to the aseptic processing, the temperature holding system 212 may be insulated pipes or a portion of the transfer system 208 (which may be insulated, uninsulated, heated, cooled, etc.) to maintain a certain predetermined temperature of the food product for a predetermined time. In one embodiment, according to the hot-fill process, the temperature holding system 212 may simply be the packaging holding the hot-filled food product for a preset time period.

The processed food product may be cooled in a food product cooling system 214. The food product cooling system 214 may be a tube in a tube heat exchanger that is connected with other tubes or pipes of the transfer system 208. Such tube may surround a portion (e.g., a pipe) of the transfer system 208. The food product cooling system 214 may be used for the aseptic packaging process to cool the processed food product in the transfer system 208, as previously discussed with regard to blocks 118-120. The food product cooling system 214 may not be necessary for when the processed food product is hot filled into a package 740.

A deaeration system 215 may be used to deaerate the food product as previously discussed with regard to block 123 in FIG. 1. The deaeration system 215 uses a vacuum pump attached to the transfer system 208 where the food product flows through with level sensors that keep a certain level of product in the transfer system 208 while the deaeration system 215 pulls the vacuum from the transfer system 208. There are controls that work to regulate the product pumps based on level sensing as well as the vacuum pump based on the air pressure. The food product comes in at the top of the deaeration system 215 and hits a plate that the food product flows over to break up air bubbles therein and then flows out of the bottom of the system. Air is sucked out of the food product such that the air is removed from the food product. This air may optionally be run through an aroma recovery system to condense the aroma from the extracted air into a liquid form and injected back into the product stream to preserve the flavor profile, as previously discussed.

It should be noted that the food product may be heated to a predefined temperature in order to deaerate the product. For example, to deaerate the food product, the food product may be heated to 30° C. and at such temperature the above-discussed deaeration process occurs to vacuum out the air in the food product. In another example the food product may be heated to 65° C. via the rapid heating process and at such temperature the above-discussed deaeration process occurs prior to the rapid heating process continuing to heat the product to the predetermined temperature.

A filling system 216 is used to the transfer the food product into the package 740. The filling system 216 may fill a pre-determined amount of food product into the package 740. The package size may be virtually any size. Possible sizes of the packaging include but are not limited to 3 ounces, 8 ounces, 16 ounces, 1 liter, 2 liter, 5 liter, 55 gallon drums, 1 ton totes, tanker cars and other sizes. Additionally, the package 740 may be an aseptic (e.g., sterile) package, an ultra-cleaned package (e.g., partially sterilized), or a clean package.

An ultra-clean hot fill system 220 may be used to partially sterilize the packaging 740. As previously stated UV radiation and/or peroxide steam (or other means) is used to partially sterilize the packaging 740.

As mentioned above, the system 200 delivers the processed food product into the package 740 so that the processed food product is contained in the package 740. As previously discussed the package 740 may contain the food product which may be a particulate food having food chunks and/or may have food puree. The package containing the food product is sealed for later use and for storing on a store shelf.

A computer/controls system 228 may be used to manage or control any aspects of the system 200. The computer/controls system 228 includes a processor and memory. Input and output devices are also included in the computer/controls system 228, such as a monitor, keyboard, mouse, etc. The computer/controls system 228 includes various modules, which includes computer code instructions to control the processor and memory. Any steps in methods 100 and 300 (FIG. 3) may be performed by the processor of the computer/controls system 228. The module for rapid heating controls may control the rapid heating system 210. The module for filling the package manages the filling of the package with processed food product. The module for pumping product through the transfer system controls the pump system 206 and other devices so that the food product (whether or processed) through the transfer system 208 from the hopper 204, through the heating system 210, through the holding system 212 and all the way until filling the package 740. The module for cooling product controls cooling the food product after the product has been processed, such as by actually providing cooling means and applying such cooling means while monitoring the temperature of the food product until the food product is cooled. A module to make the food product pumpable controls the pumpable system 202 to make the food product pumpable (discussed in block 102). Such module determines when the food is in a sufficient pumpable state and may measure a viscosity or other property and when the food product has reached a predefined threshold pumpability level, such module instructs the pumpable system 202 to end the conversion process and to deliver the food product to the receiving hopper 204.

Other modules may also be included in the computer/controls system 228 and may work with any other device of the system 200.

In some embodiments, the processed food product may be able to be stored on the shelf without refrigeration for 6 months or longer. In other embodiments, the processed food product may be stored under refrigeration conditions for 3 months or longer.

In some embodiments, the processed food product may maintain some or a majority of the product integrity and texture of the food particulates in the pre-processed food product.

In some embodiments, the processed food product may maintain some or a majority of the flavors and aromas of the pre-processed food product.

In some embodiments, the processed food product may maintain some or a majority of the nutrients of the pre-processed food product. These include but are limited to antioxidants, anthocyanins, Vitamin C, Vitamin B, Vitamin A, beta-carotene, bromelain, lycopene, and quercetin.

The processed food product is contained in the package. The package containing the food product is sealed. In one embodiment, the sealed package contains less than 8 ounces and greater than 1 ounce of food product.

The process 100 may result in a finished product 400 (FIG. 4), food product inside the package that does not require refrigeration for 6 months or more if the food product is sufficiently sterilized during the process. If lower than sterilization temperatures are desired from the process, it may result in a finished product that may require refrigeration.

Figure 3:
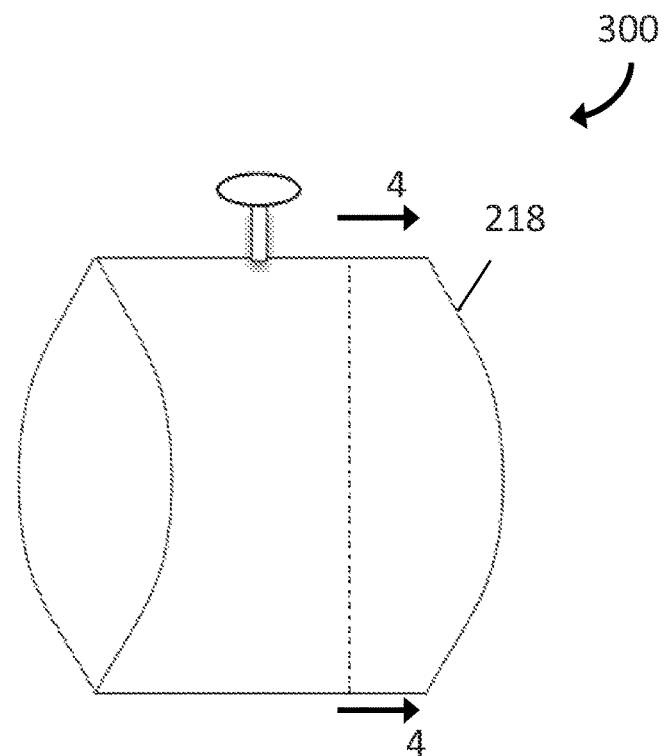
FIG. 3 is perspective view of an example of flexible packaging in accordance with an embodiment of the present invention.
Figure 4:
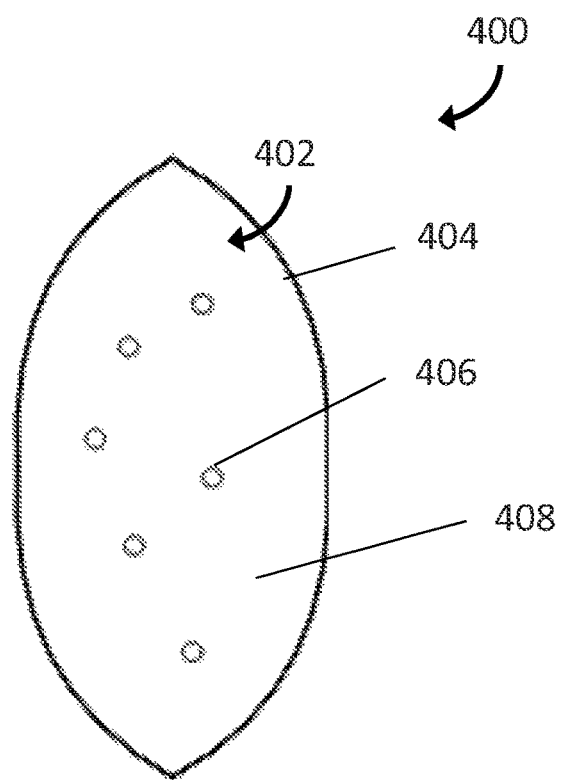
FIG. 4 is a cross-sectional view of an example of the flexible packaging of FIG. 3 along line 4-4 in accordance with an embodiment of the present invention.

FIGS. 3 and 4 shows an exemplary flexible package 300, 400 with processed particulate food product 402. Reference number 400 illustrates the view shown by cross-section 4-4 of the package 300 of FIG. 3. This exemplary flexible package 300 has an opening on the top and may have a spout that allows for easy dispensing of the product. In some embodiments, it would be possible to squeeze the flexible package to allow the food product to be dispensed through the spout. The spout may have a cap to prevent product from being dispensed unintentionally. The cap would also allow the package to be re-sealed once the product package is open. Once the product package is open, the food product could be refrigerated. In an embodiment, the package would contains less than 8 ounces and greater than 1 ounce of the food product. In one embodiment, the package contains around 3 ounces of food product.

FIG. 4 is a cross section of the package 300 at line 4-4, as mentioned above. The package has a housing or sidewalls (also referred to a "film") 404 and contains processed food product 402, which may include food particulate 406 and/or food puree 408 filling the interior cavity of the package 300. The food product 402 may contain one or more added nutraceutical products. The food particulate 406 and/or puree 408 were processed using the method 100 and system 200 as discussed above. As such the food particulate 406 may be chunks or pieces of food being of a size anywhere from about $1/16"$ to about 1" (or more).

In some embodiments, the finished product 400 may be able to be stored on the shelf without refrigeration for 6 months or more. In another embodiment, the finished product 400 may be stored under refrigerated conditions for 3 months or more.

In some embodiments, the food product 402 in the finished product 400 may be able maintain or retain greater than 50% of the nutrient content of one or more nutrients of the pre-processed food product. These nutrients may include but are not limited to antioxidants, Vitamin C, Vitamin B, beta-carotene, Vitamin A, phenolics, anthocynanins, bromelain, lycopene, and quercetin.

In some embodiments, the food particulates 406 in the finished product 400 may maintain some or a majority (e.g., 90-98%, 98-100%, etc.) of the product integrity of the food particulates in the pre-processed food product.

In some embodiments, the food product 402 in the finished product 400 may maintain some or a majority of the flavors and aromas of the pre-processed food product. In some embodiments, the food product 402 in the finished product 400 may maintain some or a majority of the integrity and texture of the pre-processed food product.

Figure 5:
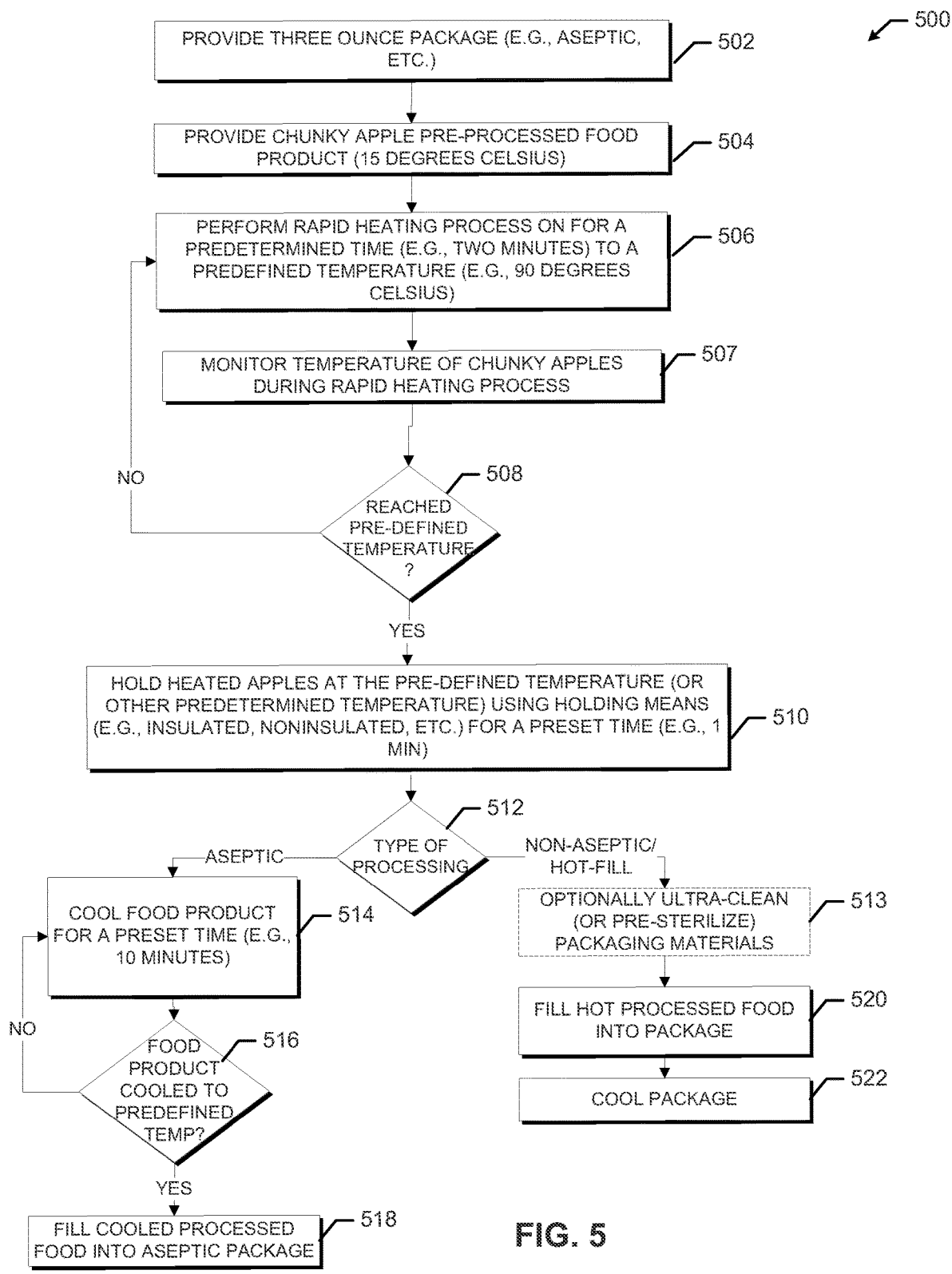
FIG. 5 is a flow chart of an example of a method to process chunky food or other materials in accordance with some embodiments of the present invention.

FIG. 5 is a flow chart of an example of a method 500 to process chunky food or other materials in accordance with some embodiments of the present invention. FIG. 5 uses apples as an example, but it is understood that any other food can be used and apples are just used for exemplary purposes.

In block 502, an empty flexible package is provided, such as a 3.2 ounce package. In block 504, a chunky apple product is provided to a food processing system 200 at around 15° C. The chunky apple product pieces may be larger than $1/16"$ in cross-sectional diameter. In an embodiment, the chunky apple product contains a mixture of $1/16$-$1/2"$ pieces and possibly apple puree and/or juice.

In block 506, the chunky apple product may be rapidly heated. The rapid heating process would increase the temperature of the chunky apple product to a pre-determined temperature rapidly possibly via a microwave heating process. The temperature may be monitored to ensure that the chunky apple product reaches the pre-determined temperature, typically around 90° C. In an embodiment, the time the chunky apple product is exposed to the rapid heating process is less than about 2 minutes.

In block 508, a determination may be made as to whether the chunky apple product has reached the pre-determined temperature of about 90° C. in the rapid heating process. The temperature of the chunky apples may be monitored to determine that the pre-determined temperature of about 90° C. has been reached. A control system may be used to control the rapid heating process.

In block 510, the chunky apple product exiting the rapid heating system may need to be held at near the exit temperature of about 90° C. for approximately 1 minute, where the exit temperature being the temperature of the food product at the moment of exiting the rapid heating system. It is understood that since the chunky apples are exiting at about 90° C. and since the chunky apple product is no longer being heated that the temperature of the chunky apples will be reduced slightly (e.g., to 87° C. or so). Regardless, the holding of the chunky apple product after rapid heating occurs in the food product temperature holding system. The temperature holding system may be insulated pipes.

In block 512, a determination may be made to package or process the chunky apple product aseptically. The aseptic process of FIG. 5 may be the same as the aseptic process of FIG. 1 as described above and thus, may include filling the package with chunky apple product after the package has been aseptically sterilized. The package may be completely flexible.

In block 514, the chunky apple product is cooled in the food product cooling system. This food product cooling system may be a tube in tube heat exchanger. In an embodiment, the time the chunky apple product is in the food product cooling system may be about 10 minutes.

In block 516, a determination is made whether the chunky apple product is sufficiently cooled for aseptic packaging. The temperature may be monitored to determine that the chunky apple product is sufficiently cooled for aseptic packaging. A control system may be used to control the cooling process. In some embodiments, the food product is cooled to below about 30° C.

In block 518, the chunky apple product is filled into an aseptic package after the desired cooling temperature is reached. The package could have been sterilized using aseptic techniques during the processing of the chunky apple product. Once the desired amount of food product has been filled into the package, the package is sealed.

In block 520, if it is determined that the chunky apple product will be hot filled, the chunky apple product may be filled into a package hot. The food product could be filled, to the pre-determined amount, after exiting the rapid heating process. The food product may not be exposed to the cooling system, but instead may be directly filled into the package from the rapid heating process.

In block 522, the package containing the hot chunky apple product may be cooled. Cooling occurs until a desired temperature of the food product is reached. A control system may be used to control the cooling process and the temperature. In some embodiments, the food product is cooled to below 35 C. It is noted that after the package is hot-filled using an ultra clean system, the package does not need to be pasteurized, thereby allowing the product to avoid an extra heating step and avoiding longer exposure to heating and high temperatures. This allows the food to maintain flavor and nutrients in addition to extending shelf life and, in some embodiments, not needed to be refrigerated. The food product is essentially not overcooked (resulting in losing nutrients and flavor) as would be the result from a thermal heating system.

Semi Frozen Processing

Described above are various methods and systems for processing food products, whether chunky or not, into flexible packaging using electromagnetic energy source. Described below are methods 600 and systems 200 for processing frozen food products or other materials to produce food products according to some embodiments. It should be understood that any elements in methods 100 and 500 discussed above may be employed in methods 600 and 800 and vice versa. Any description of the elements of any above-discussed method may be equally applicable to any element of the below-discussed methods and vice versa.

Figure 6:
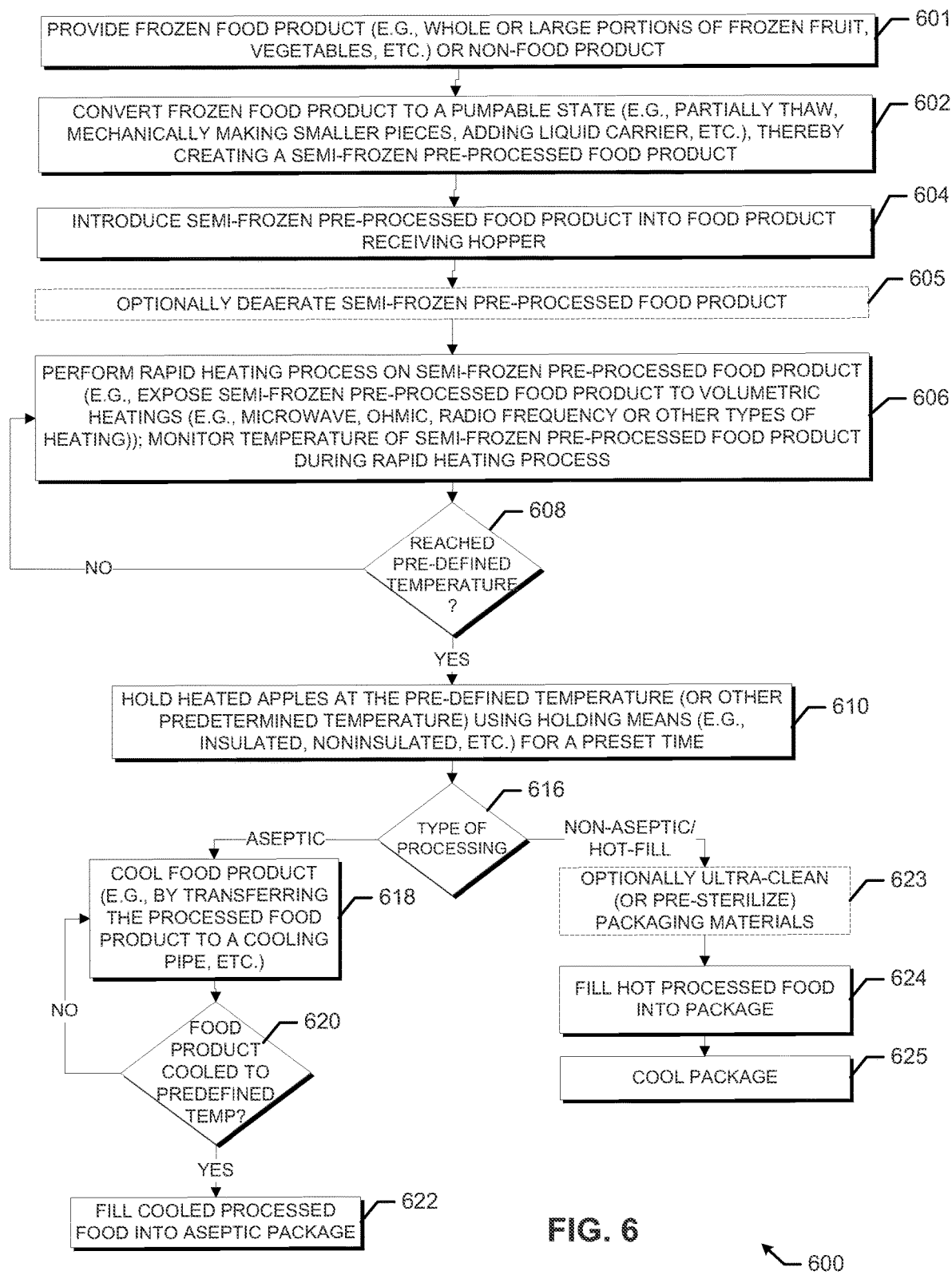
FIG. 6 is a flow chart of an example of a method to convert frozen food products to shelf stable or refrigerated food products in accordance with some embodiments of the present invention.

Referring first to FIG. 6, in block 601, a user provides frozen food product to the system. The frozen food product may relate to fruits, vegetables and other consumable items that have at least a portion below 0 degrees Celsius, or in one embodiment all of the frozen food product is less than 0 degrees Celsius. It is should be understood that the present invention need not be food and may also be applicable to non-food products.

In block 602, the frozen food product is presented and may be converted into a pumpable state. There are at least three ways a pumpable state may be achieved including one or more combinations of the three. In a first embodiment, the frozen food product may be converted into a pumpable state by partially thawing the frozen food product by refrigeration or at ambient temperature. This allows at least one or more portions of the frozen food product to reach a melting temperature and therefore is easier to be thawed when being pumped through a pipe. For some food products, the frozen food product is thawed so that at least a portion of the food product (or all of the food product) is around zero degrees Celsius (or other level where the food product is frozen) while other portions (or all) is above zero degrees Celsius (or other level where the food product is frozen). For products with materials which lower the melting point, such as salt and/or sugar, the melting temperature of the food product may be lower and thus the food product temperature may be lower than zero degrees Celsius.

In a second embodiment, the frozen food product may be converted into a pumpable state by using a mechanical process to slice, smash, or chop the frozen food product (or perform some other process that will facilitate pumping of the frozen food product, including making the food product into smaller pieces). At this point, the food may be frozen granular pieces having a size that allows the granular pieces to be pumped through a tube. In one embodiment, the frozen granular pieces have a diameter of about 1 cm, 1 mm or other diameter which would allow the frozen granular pieces to be pumped in a pipe having a diameter of about one inch to three inches. Heat may be introduced to the frozen granular pieces such that at least portions of the frozen food product may be allowed to reach a temperature of about zero degrees Celsius (or some other melting point of the food product).

In a third embodiment, the food product may be converted into a pumpable state by adding one or more liquid carriers to the frozen food product. The introduction of liquid carriers allows at least portions of the frozen food product to reach a melting temperature or allows the frozen food product to travel along with a pumpable substance which will act as a lubricant when the food product travels along or through a pipe (or other transfer system). The pumpable state may require the food product to be semi-frozen, which refers to the material being pumped being partially frozen and partially not frozen. According to one embodiment, being semi-frozen may include at least a portion of the frozen food product being at a melting temperature, at least another portion of the frozen food product above the melting temperature, and/or at least yet another portion of the frozen food product being at a temperature below the melting temperature and/or any combination thereof. According to another embodiment, being semi-frozen may refer to the pumpable material being frozen granular pieces of food (e.g., most of the granular food pieces being below the freezing point of such food product) combined with a liquid carrier, such as water. The pumpable state allows the frozen food product to be pumped into the pipes (or other transfer means) of the system.

As mentioned above, other embodiments can include a combination of the above-mentioned first, second and/or third embodiments for converting the food product into a pumpable state. For example, the frozen food product could be partially thawed and also added to a liquid carrier. In another embodiment, the frozen food product could be ground up into small pieces, partially thawed and then added to a liquid carrier. In yet another embodiment, the frozen food product could be ground up or minced into small pieces relative to the diameter of the pipe and partially thawed. Other ways for making the frozen food product pumpable into the pipe are also possible and the present invention should not be limited to the above examples.

Figure 7:
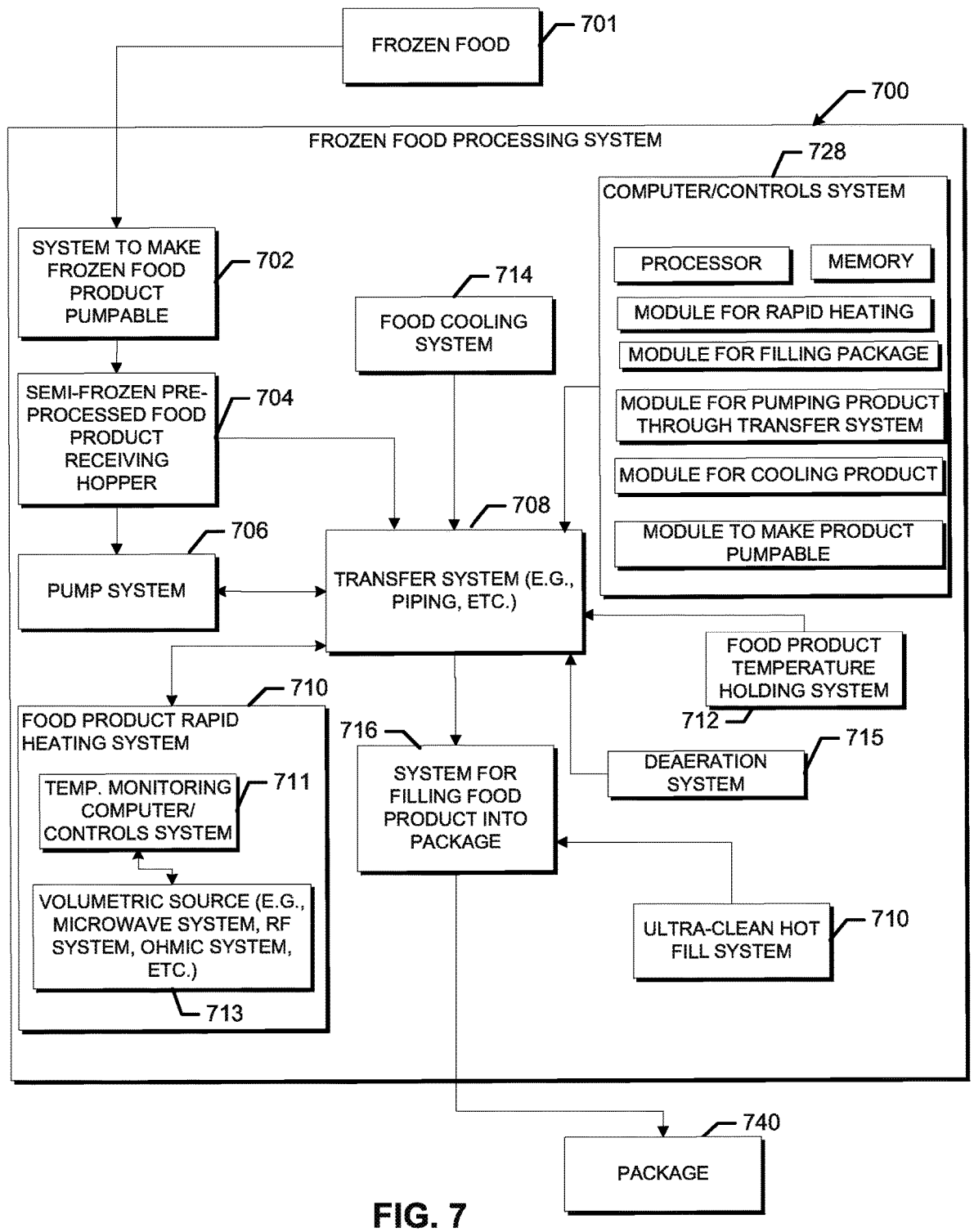
FIG. 7 is a block schematic diagram of an exemplary system of converting frozen food products to shelf stable or refrigerated food products in accordance with some embodiments of the present invention.

In block 604, a semi-frozen pre-processed food product is provided to a food processing system 700 (FIG. 7). As mentioned above, the semi-frozen pre-processed food product is in a pumpable state allowing it to be processed through the system 700. This semi-frozen pre-processed food product could be fruit, vegetable, protein, dairy-based product, any other consumable food or any combination. This semi-frozen pre-processed food product could be a particulate (e.g., variable-sized or consistent-sized chunks which are larger than other portions of the food product) of a fruit, a vegetable, protein, dairy-based product, any other consumable foods or any combination thereof. When the semi-frozen pre-processed food product includes particulates (e.g., chunks), the semi-frozen pre-processed food product contains food pieces that may be larger than $\frac{1}{16}$" in cross-sectional diameter. In an embodiment, the semi-frozen pre-processed food product contains a mixture of $\frac{1}{8}$-1" pieces of fruit, vegetable and/or any other consumable food products and fruit, vegetable, and/or any other consumable food products in a puree and/or liquid form.

Under block 605, as an optional step for processing oxygen sensitive foods such as fruits, the food product may undergo a deaeration step after being made into a pumpable product and immediately prior to the rapid heating process. Such deaertion process may be the same as discussed above with regard to FIG. 1. The deaerator is a vessel that the product flows through under a vacuum to remove the air from the product.

Aroma recovery is an optional addition to the deaeration system. When one pulls the air out of the food product (especially at higher temperatures) some of the flavors are pulled off of the food product in the air. Some of the deaeration systems run the effluent air through a condenser to turn that 'aroma' back into a liquid form. Once it is liquid one can 1) extract the air, concentrate the air into liquid form and store the liquid as a natural flavor in one embodiment, or 2) in another embodiment, one could inject such aroma liquid back into the product at a later point in the process to ensure that the processed food product maintains all of its original flavor.

For the deaerator, there is a vacuum pump attached to the vessel (or transfer system) where the semi-frozen food product flows through with level sensors that keep a certain level of semi-frozen food product in the vessel while the deaerator pulls the vacuum from the top of the vessel. Controls work to regulate the product pumps based on level sensing as well as the vacuum pump based on the air pressure. The semi-frozen food product comes in from the top and hits a plate that the food product flows over to break up air bubbles therein and then the semi-frozen food product flows out of the bottom of the deaerator portion of the transfer system.

The deaeration system reduces oxidation once the semi-frozen food product is packaged and increases shelf life as well as nutrient retention.

It should be noted that the deaeration system and process (as like some steps in method 600) may be optional, as depicted in FIG. 1 by dashed lines.

Regardless, the semi-frozen pre-processed food product which is in pumpable form is provided to a transfer system, which may include one or more pipes or conduits, a conveyor belt system or any other way to transfer the semi-frozen pre-processed food product to other devices of the system of FIG. 2. In one embodiment, the semi-frozen pre-processed food product is transferred from a container to a pipe whereas such pipe transfers the semi-frozen pre-processed food product to a rapid heating device, as discussed below.

In block 606, the semi-frozen pre-processed food product may be rapidly heated directly in response to the semi-frozen pre-processed food product being converted into a pumpable state. The rapid heating process increases the temperature of the semi-frozen pre-processed food product to a pre-determined temperature substantially rapidly, possibly via a volumetric heating process. This pre-determined temperature may be monitored to ensure that the semi-frozen pre-processed food product reaches the pre-determined temperature. The rapid heat process uses a rapid heating device which could be a device that delivers electromagnetic energy to the semi-frozen pre-processed food product using an electromagnetic source. For example, the electromagnetic source may be a microwave generator so that microwave energy is focused into the semi-frozen pre-processed food product from the microwave generator. Alternatively, or additionally, the electromagnetic source may be a device that delivers radio frequency, ohmic and/or other forms of volumetric heating to the semi-frozen food product. The rapid heating system is discussed in more depth later with regard to FIG. 2.

In block 606, the semi-frozen pre-processed food product is directly heated from a frozen or semi-frozen state to a specific pre-defined temperature and such process happens directly as in response to the frozen food product being converted into a pumpable state. This predefined temperature is referred below hereout.

The semi-frozen pre-processed food product may be heated in a relatively short duration of time (e.g., less than or equal to 4 minutes). In an embodiment, the time the semi-frozen pre-processed food product is directly exposed to the rapid heating process from a frozen or semi-frozen state so that the semi-frozen pre-processed food product is heated to the pre-determined temperature may be less than or equal to about 3 minutes. In another embodiment, the time that the semi-frozen pre-processed food product may be heated directly from a frozen or semi-froze state to the pre-determined temperature is less than or equal to about 2 minutes. In another embodiment, the time is less than or equal to 1 minute.

As stated above, the semi-frozen pre-processed food products are heated to the predefined temperature. This predefined temperature may be preset or predetermined by the operator of the system such that the food product reaches such temperature and the system does not substantially heat the food product above such predefined temperature.

High acid products, i.e. semi-frozen pre-processed food products with high acidity or products having a pH less than 4.6, may be heated (using volumetric heating, such as ohmic, microwave or radio frequency heating) to a pre-defined temperature of 70° C. or above for proper processing. Once the semi-frozen pre-processed food product has reached this temperature, the semi-frozen pre-processed food product may be either placed into packaging or cooled in direct response to the semi-frozen pre-processed food product being heated to the pre-determined temperature for a predetermined period of time, as will be discussed later. In one embodiment, the predefined temperature that will heat the high acid products may be at any temperature between about 85° C. to 100° C. and held at that temperature for the above-discussed time period (e.g., less than 4 minutes, less than 3 minutes, less than 2 minutes, less than 1 minute, etc.).

Lower acid products, or products having a pH greater than or equal to 4.6, may be heated (using volumetric heating, such as ohmic, microwave or radio frequency heating) at any temperature above 100° C. (and held at this temperature for the above-discussed time period). In one embodiment, the lower acid products are heated to about 120° C. to 140° C.

As briefly mentioned above, the temperature of the semi-frozen food product is monitored while being rapidly and volumetrically heated. Such monitoring may be performed using a temperature sensor. The monitored temperature is fed back into the system and when the system determines that the semi-frozen food product has reached the predefined temperature, the system stops substantially heating the semi-frozen food product so that the temperature of semi-frozen food product does not continue to increase (or the semi-frozen food product temperature is held constant).

Once the food product has been heated to the pre-determined temperature, the food product exiting the rapid heating process would have minimal variation in temperature. In an embodiment, the food product exiting the rapid heating process would not vary more than about +/−20° C. around the pre-determined temperature for low acid products and about +/−15° C. around the pre-determined temperature for high acid products. This approximate maximum variation in temperature includes any point in the food product, including the temperature at the center of any pieces of fruit, vegetable, protein, dairy, and/or any other consumable food in the food product. Because the food products are rapidly heated and the temperature does not vary significantly at exiting the rapid heating process, the flavors and natural nutrients of the fruit are maintained as opposed to be degraded using conventional heating methods which would overheat at least some portions of the food product and/or expose the food product to high temperatures for a longer duration of time.

In block 608, a determination may be made as to whether the food product has reached the predefined temperature in the rapid heating process while the food product is being exposed to volumetric heating (e.g., ohmic, microwave or radio frequency heating). As mentioned above, the temperature of the food product is monitored to determine that the pre-determined temperature has been reached, and a control system is used to control the rapid heating process that may integrate feedback from the monitored temperature.

If the decision in block 608 is that the predefined temperature of the food product has not been reached, the method 600 may loop back to block 606 where the semi-frozen food product is continued to be heated and the temperature thereof monitored. Once the predefined temperature is reached, decision block 608 allows method 600 to proceed to block 610. It should be noted that the above-discussed rapid heating may inactive enzymes that cause spoilage and destroy some or all of the pathogens that lead to spoilage and unsafe foods.

In block 610, the food product exiting the rapid heating system may need to be held at or near the exit temperature for a pre-determined length of time, where the exit temperature being the temperature of the food product at the moment of exiting the rapid heating system. This occurs in the food product temperature holding system. The temperature holding system may be insulated pipes or other means for holding the food product temperature for a predetermined time (allowing for some thermal escapte or temperature dropping since the product is not being heated at this point). The amount of time that the food product temperature is kept constant is relatively short. In an embodiment, the time the pre-processed food product is contained in the holding system may be less than about 2 minutes. In another embodiment, the time in the holding system is less than 1 minute.

In block 616, a determination may be made the type of package to receive the processed food product. Either the food product will be placed into aseptic packaging or will be hot-filled into the packaging (e.g., filling while the food product temperature is still substantially at the predefined temperature), according to some embodiments. The aseptic process (as represented by blocks 618 and 620 and discussed more below) includes filling the package with food product after the package has been sterilized via an aseptic process. The package may be flexible or the package may be rigid. The hot-fill process 624 includes filling a package with food product while the food product is still at a high temperature from the rapid heating process. The hot-fill process is the same as discussed above for FIG. 1.

In block 618, if aseptic packaging (i.e., packaging that has been substantially sterilized) is desired, the food product is cooled in the food product cooling system. This food product cooling system may be a heat exchanger such as a pipe in a cooling tube, shell in tube, and/or triple tube heat exchangers. Transfer of thermal heat occurs from the food product through the transfer system to the cooling system. In one embodiment, the cooling system includes a cooling tube surrounding the transfer system (or pipe) and the cooling tube has cool water running therethrough to pull heat from the food product in the transfer system.

The cooling time in the critical temperature zone is relatively short. In an embodiment, the time the pre-processed food product is in the food product cooling system may be less than about 20 minutes. In an embodiment, the time in the food product cooling system is less than about 7 minutes.

In block 620, a determination is made whether the product is sufficiently cooled for aseptic packaging. The temperature of the food product may be monitored while the food product is being cooled in the cooling system to determine that the product is sufficiently cooled for aseptic packaging. A control system may be used to manage, monitor, and control the cooling process. In some embodiments, the food product is cooled to below 30° C.

In block 622, the processed food product is filled into an aseptic package after the desired cooling temperature of the food product is reached. The package could have been sterilized using aseptic techniques during the processing of the food product.

If the decision in decision block 616 is that the hot fill process is used, the method 600 may continue to block 623 or 624. As used herein, the term "hot-fill" process refers to block 624 and relates to filling packaging while the processed food product is at the pre-defined temperature of block 608, according to an embodiment.

In block 623, as an optional step in the hot fill process, the packaging materials may be pre-sterilized using UV radiation and/or peroxide steam (or other means). The packaging materials that are to be pre-sterilized may include a film used to produce a flexible pouch of the packaging as well as a plastic fitment of the packaging that is used for consuming the product. This is called "ultra-clean" process and is the same as that discussed in FIG. 1. The ultra-clean process of block 623 would be done under a controlled air flow environment with sterile air filtration (usually HEPA filtered) to prevent any recontamination of the packaging once sterilized. Once the package is pre-sterilized, it should remain in the sterile air environment until it is filled with the processed food product and the packaging is directly sealed thereafter.

The ultra-clean process of block 623 may be considered to be ultra-clean but not aseptic. In one embodiment, the difference between aseptic and ultraclean is a matter of the level of sterility of the packaging. An ultracleaned package is less sterile than aseptic packaging but still achieving a relative sterility of the packaging, as previously described.

In aseptic packaging, one would fill the product at ambient temperature so it will not sterilize the package which means the package is sterilized by the filler. In ultraclean processing, one sterilizes the package to a degree but the hot processed food product serves to sterilize the package to the degree needed.

By adding the ultra-clean step 623 to method 600 subsequent to the rapid heating, the product need not be pasteurized and thus the time the product is heated is lowered. This would serve to preserve the quality and increase the nutrient retention of the product. After the holding step, the hot-filled package would then go into the cooling step as already indicated.

It should be understood that block 623 is optional, as indicated by the dashed lines. As such, method 600 may proceed directly from block 618 to block 624 instead of performing block 623.

Regardless, blocks 623 or 624 are performed immediately and automatically in response to block 610 (or immediately after method 600 proceeding past block 608), according to some embodiments.

In block 624, if it is determined that the food product will be hot-filled, the food product is filled into a package hot. The food product may be filled into the package a predetermined amount in response after exiting the rapid heating process. The food product may not be exposed to the cooling system, but instead may be directly filled into the package from the rapid heating process.

In block 625, the package containing the hot food product may be cooled. Cooling of the package may occur until a desired temperature is reached. In one embodiment, the package may be sealed and then placed into a cooling water bath which will extract thermal energy from the food product in the package. A control system may be used to control the cooling process of the packaging and the temperature. In some embodiments, the package containing the hot food product is cooled to below 35 C.

FIG. 7 is a block schematic diagram of an exemplary system 700 of converting frozen food products to shelf stable or refrigerated food products in accordance with some embodiments of the present invention. A frozen food product 701 is provided to the system 700.

A pumpable system 702 to make the frozen product pumpable may be employed. In some embodiments, the pumpable system 702 may make a frozen product pumpable by partially thawing the frozen food product by refrigeration or at ambient temperature until a desired pumpable state is reached. In some embodiments, the pumpable system 702 may make a frozen product pumpable by a mechanical process that slices, dices, and/or purees the frozen food product, introducing heat and allowing, at least portions of the frozen food product to reach a desired pumpable state, as previously mentioned. In some embodiments, the pumpable system 702 may make a frozen product pumpable by adding a liquid carrier to the frozen food product, as previously mentioned. The introduction of a liquid carrier allows the frozen product to reach a desired pumpable state, as previously mentioned. In some embodiments, a combination of methods may be used to make the frozen product pumpable.

In block 704, the semi-frozen pre-processed food product may be added to the receiving hopper or any other container. The receiving hopper 704 holds the incoming semi-frozen pre-processed food until it is pumped into the system. The receiving hopper 704 assures that the system has enough semi-frozen pre-processed food product to be pumped in the system so that there are minimal or no gaps in food product provided to the system during operation, according to some embodiments.

A pump system 706 is connected to the receiving hopper 704 and may be used to convey the food product throughout the system 700. The pump system 706 may receive semi-frozen pre-processed food product from the hopper and provide means for pumping the food product throughout the system 700. The pump system 706 may be interconnected to a transfer system 708 allowing the pump system 706 to pump the food products through the transfer system 708.

The transfer system 708 is used to interconnect the various systems, including the pump system 706, for processing. The transfer system 708 may be a system of interconnected pipes that connect one or more of the systems together, such as the pump system, the receiving hopper, the heating and cooling systems, the filling system, etc. The transfer system 708 may allow for the food product to easily transition from one of the various systems to another within the processing system. The transfer system 708 may be a system of pipes that are substantially hollow but allow for a pumpable substance to be pumped through.

A rapid heating system 710 is thermally and/or electrically communicative with the transfer system 708 and would increase the temperature of the semi-frozen pre-processed food product in the transfer system 708 to a pre-determined temperature, where the pre-determined temperature was discussed above. The temperature may be monitored to ensure that the semi-frozen pre-processed food product reaches the pre-determined temperature. A computer system 728 (which is discussed below) could be used to control the temperature exiting the rapid heating system. The semi-frozen pre-processed food product may be heated to the pre-determined temperature in a short duration of time, as previously discussed.

As stated above, at least a portion or all of the semi-frozen pre-processed food product enters a food product rapid heating system 710. In some embodiments, the semi-frozen pre-processed food product enters the rapid heating system 710 in pumpable form, as discussed above. In some embodiments, the semi-frozen pre-processed food may be pre-heated prior to entering the rapid heating system 710, as stated above. This allows continuous and direct processing of a frozen food product from a frozen state all the way to complete processing and packaging without having a separate thawing step prior to placing the food product in a rapid heating system 710 or other heating system.

The rapid heating system 710 may include a volumetric source 713. The rapid heat process uses the volumetric source 713 which could be a system that delivers electromagnetic energy to the semi-frozen pre-processed food product until the frozen food product or semi-frozen food product is heated to the above-discussed predefined temperature. For example, the volumetric source 713 may be a microwave generator so that microwave energy is focused into the semi-frozen pre-processed food product from the microwave generator until the frozen food product or semi-frozen food product is heated to the above-discussed predefined temperature. Alternatively, or additionally, the volumetric source 713 could delivers radio frequency energy, ohmic energy and/or other forms of volumetric heating until the frozen food product or semi-frozen food product is heated to the above-discussed predefined temperature.

The rapid heating system 710 also may include a temperature monitoring computer/controls system 711 which manages the volumetric source 713 for delivering electric (e.g., microwave, ohmic RF, etc.) energy to the frozen (or semi-frozen) food product. For example, the temperature monitoring computer/controls system 711 controls the volumetric source 713 to turn it on and off for delivering energy to the food product in the transfer system 708. Additionally, the temperature monitoring computer/controls system 711 monitors the temperature of the frozen (semi-frozen) food product while it is being heated by the volumetric source 713. When the food product is heated to the pre-defined temperature, the temperature monitoring computer/controls system 711 turns the volumetric source 713 off (or decreases the power thereof) so that the food product is not heated above such temperature.

A temperature holding system 712 may be employed to hold the temperature of the food product at or near the exit temperature for a pre-determined length of time, wherein such exit temperature is the temperature of the food product at the moment of exiting the rapid heating system 710. The temperature holding system 712 may be insulated pipes or a portion of the transfer system 708 to maintain a certain predetermined temperature of the food product for a predetermine time.

The processed food product may be cooled in a food product cooling system 714. The food product cooling system 714 may be a tube in a tube heat exchanger that is connected with other tubes or pipes of the transfer system 708. Such tube may surround a portion (e.g., a pipe) of the transfer system 708. The food product cooling system 714 may be used for the aseptic packaging process to cool the processed food product in the transfer system 708, as previously discussed with regard to blocks 118-120. The food product cooling system 714 may not be necessary for when the processed food product is hot filled into a package 740.

A deaeration system 715 may be used to deaerate the food product as previously discussed with regard to block 123 in FIG. 1. The deaeration system 715 uses a vacuum pump attached to the transfer system 708 where the food product flows through with level sensors that keep a certain level of product in the transfer system 708 while the deaeration system 715 pulls the vacuum from the transfer system 708. There are controls that work to regulate the product pumps based on level sensing as well as the vacuum pump based on the air pressure. The food product comes in at the top of the deaeration system 715 and hits a plate that the food product flows over to break up air bubbles therein and then flows out of the bottom of the system. Air is removed from of the food product. As previously discussed, this air may optionally be run through an aroma recovery system to condense the aroma from the extracted air into a liquid form and injected back into the product stream to preserve the flavor profile.

A filling system 716 is used to the transfer the food product into the package 740. The filling system 716 may fill a pre-determined amount of food product into the package 740. The package size may be virtually any size. Possible sizes of the packaging include but are not limited to 3 ounces, 8 ounces, 16 ounces, 1 liter, 2 liter, 5 liter, 55 gallon drums, 1 ton totes, tanker cars and other sizes. Additionally, the package 740 may be an aseptic (e.g., sterile) package, an ultra-cleaned package (e.g., partially sterilized), or a clean (but not sterile) package.

An ultra-clean hot fill system 720 may be used to partially sterilize the packaging 740. As previously stated UV radiation and/or peroxide steam (or other means) is used to partially sterilize the packaging 740.

As mentioned above, the system 700 delivers the processed food product into the package 740 so that the processed food product is contained in the package 740. As previously discussed the package 740 may contain the food product which may be a particulate food having food chunks and/or may have food puree. The package containing the food product is sealed for later use and for storing on a store shelf. A computer/controls system 728 may be used to manage or control any aspects of the system 700. The computer/controls system 728 includes a processor and memory. Input and output devices are also included in the computer/controls system 728, such as a monitor, keyboard, mouse, etc. The computer/controls system 728 includes various modules, which includes computer code instructions to control the processor and memory. Any steps in methods 600 and 800 (FIG. 8) may be performed by the processor of the computer/controls system 728.

The module for rapid heating controls may control the rapid heating system 710. The module for filling the package manages the filling of the package with processed food product. The module for pumping product through the transfer system controls the pump system 706 and other devices so that the food product (whether frozen or processed) through the transfer system 708 from the hopper 704, through the heating system 710, through the holding system 712 and all the way until filling the package 740. The module for cooling product controls cooling the food product after the product has been processed, such as by actually providing cooling means and applying such cooling means while monitoring the temperature of the food product until the food product is cooled. A module to make the frozen food product pumpable controls the pumpable system 702 to make the food product pumpable (discussed in block 702). Such module determines when the frozen food is in a sufficient pumpable state and may measure a viscosity or other property and when the frozen food product has reached a predefined threshold pumpability level, such module instructs the pumpable system 702 to end the conversion process and to deliver the semi-frozen food product to the receiving hopper 704.

Other modules may also be included in the computer/controls system 728 and may work with any other device of the system 700.

In some embodiments, the processed food product may be able to be stored on the shelf without refrigeration for 6 months or longer. In other embodiments, the processed food product may be stored under refrigeration conditions for 3 months or longer.

In some embodiments, the processed food product may maintain some or a majority of the product integrity and texture of the food particulates in the semi-frozen pre-processed food product.

In some embodiments, the processed food product may maintain some or a majority of the flavors and aromas of the semi-frozen pre-processed food product.

In some embodiments, the processed food product may maintain some or a majority of the nutrients of the semi-frozen pre-processed food product. These include but are limited to antioxidants, anthocyanins, Vitaman C, Vitaman B, Vitamin A, beta-carotene, bromelain, lycopene, and quercetin.

Figure 8:
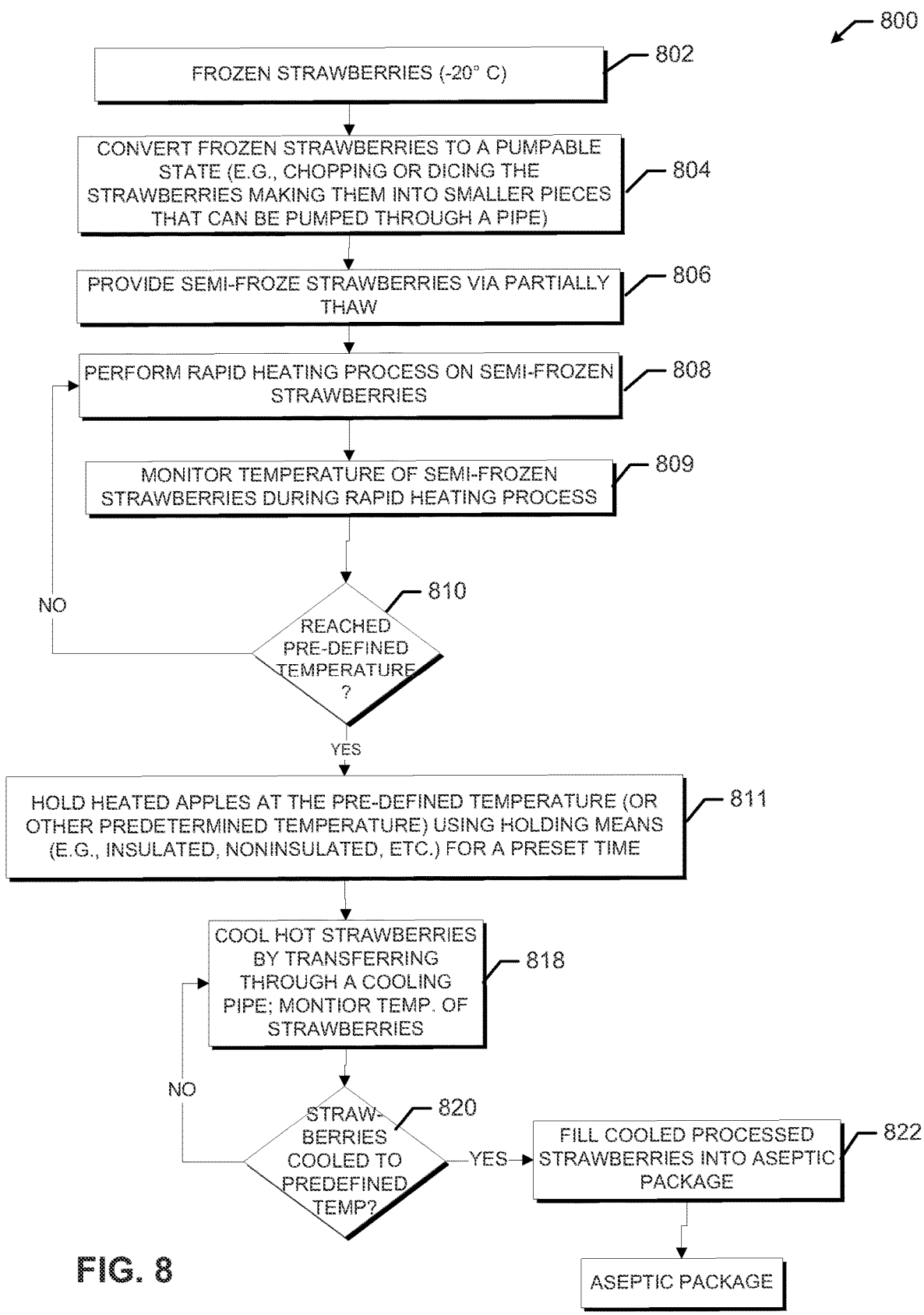
FIG. 8 is a flow chart of an exemplary embodiment of the system of converting frozen food products to shelf stable or refrigerated food products in accordance with some embodiments of the present invention.

FIG. 8 is a flow chart of an example embodiment of the system of converting frozen food products to shelf stable or refrigerated food products in accordance with some embodiments of the present invention. In block 802, frozen strawberries are presented at around −20 C. The frozen strawberries may be converted into a pumpable state to be provided to the system.

In block 804, the frozen strawberries are converted to a pumpable state (semi-frozen) by a combination of partially thawing and mechanically dicing, slicing, and pureeing the strawberries. The strawberries may be removed from the −20° C. temperature and kept in a refrigerated state until pumpable state has been reached, wherein at least a portion of the strawberries may be at a temperature of around 0° C. The pumpable state of the frozen food product is reached within 2 days of refrigeration or less. The pumpable state may allow the strawberries to be pumped into the pipes of the transfer system.

In block 806, the semi-frozen strawberry product is provided to a food processing system 700. The semi-frozen strawberry product may be in a pumpable state allowing it to be processed through the system 700. When the semi-frozen strawberry product includes particulates, the strawberry pieces may be larger than 1/16" in cross-sectional diameter. In an embodiment, the semi-frozen strawberry product contains a mixture of 1/8-1" pieces and possibly strawberry puree.

In block 808, the semi-frozen strawberry product may be rapidly heated. The rapid heating process would increase the temperature of the semi-frozen strawberry product to a pre-determined temperature rapidly possibly via a microwave heating process. The temperature may be monitored to ensure that the semi-frozen strawberry product reaches the pre-determined temperature, typically around 90 C. In an embodiment, the time the semi-frozen product is exposed to the rapid heating process may be less than about 2 minutes.

In block 810, a determination may be made as to whether the strawberry product has reached the pre-determined temperature in the rapid heating process. The temperature may be monitored to determine that the pre-determined temperature has been reached. A control system may be used to control the rapid heating process.

In block 811, the strawberry product exiting the rapid heating system may need to be held at near the exit temperature for approximately 1 minute, where the exit temperature being the temperature of the food product at the moment of exiting the rapid heating system. This occurs in the food product temperature holding system in one embodiment (such as in the aseptic processing). The temperature holding system may be insulated pipes. In other embodiment, according to hot-filling process, the temperature holding system may simply be the hot-filled product being in the package for a preset time prior to the package and food product being cooled.

In block 816, the strawberry product may be packaged aseptically. The aseptic process includes filling the package with strawberry product after the package has been sterilized via an aseptic process. The package may be flexible or the package may be ridged.

In block 818, the strawberry product is cooled in the food product cooling system. This food product cooling system may be a tube in tube heat exchanger. In an embodiment, the time the strawberry product is in the food product cooling system may be about 20 minutes.

In block 820, a determination is made whether the strawberry product is sufficiently cooled for aseptic packaging. The temperature may be monitored to determine that the strawberry product is sufficiently cooled for aseptic packaging. A control system may be used to control the cooling process. In some embodiments, the food product is cooled to below about 30 C.

In block 822, the strawberry product is filled into an aseptic package after the desired cooling temperature is reached. The package could have been sterilized using aseptic techniques during the processing of the strawberry product. Once the desired amount of food product has been filled into the package, the package is sealed.

It should be noted that any of the elements of the methods may be applicable to any other elements of any of the other methods. And as such, the blocks and related description apply to any elements.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for continuous processing frozen food product into a package, the method comprising:
   providing a frozen food product;
   providing a transfer system comprising a series of pipes;
   converting the frozen food product to a pumpable state which will allow the frozen food product to be pumped through the pipes, thereby creating a pumpable frozen food product, the converting comprising mechanically reducing a size of pieces of the frozen food product into frozen granular pieces;
   directly in response to the converting the frozen food product to a pumpable state, processing the pumpable frozen food product comprising:
      pumping the converted frozen food product through the pipes of the transfer system into a heating system;
      heating, using electromagnetic heating from an electromagnetic source, of the pumpable frozen food product for a predetermined time until the pumpable frozen food product reaches a predefined temperature, thereby creating a processed food product, the predefined temperature being sufficiently high to sterilize the processed food product; and
      holding the processed food product at the predefined temperature for a predetermined time;
   selecting whether to process the processed food product either aseptically or hot filled;
   in response to selecting to process the processed food product aseptically:
      cooling the processed food product until the food product reaches a predetermined temperature; and
      filling a flexible package with the cooled processed food product;
   in response to selecting to process the processed food product hot filled, directly delivering the processed food product at the predefined temperature into a package.

2. The method of claim 1, further comprising deaerating the pumpable frozen food product to remove air from the pumpable frozen food product.

3. The method of claim 1, wherein, prior to converting the frozen food product to a pumpable state, the frozen food product is incapable of being pumped through the transfer system.

4. The method of claim 1, wherein the transfer system directly delivers the pumpable frozen food product to the heating system and directly heats the pumpable frozen food product to the predefined temperature without a separate thawing step prior to the heating.

5. The method of claim 1, wherein the electromagnetic source comprises a microwave generator.

6. The method of claim 1, wherein the converting comprises determining when the frozen food product has reached a predefined threshold pumpability level by measuring a viscosity of the frozen food product.

7. A method for processing a frozen food product, the method comprising:
providing a frozen food product;
providing a transfer system comprising a series of pipes;
converting, using a pumpable system, the frozen food product to a pumpable state which will allow the frozen food product to be pumped through the transfer system, thereby creating a pumpable frozen food product, the converting comprising mechanically reducing a size of pieces of the frozen food product into frozen granular pieces;
directly in response to the converting the frozen food product to a pumpable state, processing the pumpable frozen food product comprising:
pumping the converted frozen food product through the pipes of the transfer system into a heating system;
heating, using a volumetric heating device, of the pumpable frozen food product for a predetermined time until the pumpable frozen food product reaches a predefined temperature, thereby creating a processed food product, the predefined temperature being sufficiently high to sterilize the processed food product; and
in response to creating the processed food product, delivering the processed food product into a package.

8. The method of claim 7, further comprising holding the processed food product at the predefined temperature for a predetermined time.

9. The method of claim 7, wherein the transfer system comprises a system of pipes connecting the pumpable system with the volumtetric heating device.

10. The method of claim 7, further comprising:
selecting whether to process the processed food product either aseptically or hot filled;
in response to selecting to process the processed food product aseptically:
cooling the processed food product until the food product reaches a predetermined temperature; and
filling a flexible package with the cooled processed food product;
in response to selecting to process the processed food product hot-filled directly delivering the processed food product into a package.

11. The method of claim 7, wherein the converting comprises determining when the frozen food product has reached a predefined threshold pumpability level by measuring a viscosity of the frozen food product.

12. A system for continuous processing frozen food product into a package, the system comprising:

a system to make a frozen food product pumpable, wherein the frozen food product is converted to a pumpable state which allows the frozen food product to be pumped through the pipes, thereby creating a pumpable frozen food product;
a controls system that controls the system to convert the frozen food product to the pumpable state;
a receiving hopper for receiving the pumpable frozen food product;
a transfer system comprising a series of pipes;
a heating system comprising a volumetric generator, the volumetric generator configured for heating of the pumpable frozen food product for a predetermined time until the pumpable frozen food product reaches a predefined temperature, thereby creating a processed food product, the predefined temperature being sufficiently high to sterilize the processed food product;
a pump system to pump the pumpable frozen food product from the receiving hopper to the heating system; and
a fill system for delivering the processed food product into a package,
wherein the controls system is configured to direct the pump system to pump the converted frozen food product through the pipes of the transfer system into the heating system in direct response to the conversion of the frozen food product to a pumpable state.

13. The system for continuous processing frozen food product into a package of claim 12, further comprising a hold system for holding the processed food product at the predefined temperature for a predetermined time.

14. The system for continuous processing frozen food product into a package of claim 12, wherein:
the controls system is configured to determine whether to process the processed food product either aseptically or hot filled, and configured to perform a method comprising:
in response to determining to process the processed food product aseptically:
cooling the processed food product until the food product reaches a predetermined temperature; and
filling a flexible package with the cooled processed food product;
in response to determining to process the processed food product hot filled, directly delivering the processed food product into a package.

15. The system for continuous processing frozen food product into a package of claim 12, wherein the transfer system directly connects the pumpable system with the heating system and connects the heating system with the fill system.

16. The system for continuous processing frozen food product into a package of claim 12, wherein the fill system is configured to selectively perform both aseptic packaging and hot-filled packaging.

17. The system for continuous processing frozen food product into a package of claim 12, wherein the controls system is adapted to determine when the frozen food product is in a sufficiently pumpable state by measuring a viscosity of the frozen food product.

18. The system for continuous processing frozen food product into a package of claim 12, wherein the controls system controls the heating system to heat the pumpable frozen food product directly in response to the conversion of the frozen food product to the pumpable state.

\* \* \* \* \*

UNITED STATES PATENT AND TRADEMARK OFFICE
CERTIFICATE OF CORRECTION

PATENT NO. : 10,716,435 B2
APPLICATION NO. : 14/364019
DATED : July 21, 2020
INVENTOR(S) : Drozd et al.

Page 1 of 1

It is certified that error appears in the above-identified patent and that said Letters Patent is hereby corrected as shown below:

On the Title Page

Item (71) Applicant:
Please insert -- (71) Applicant: HBC Holding Company, LLC,
Raleigh, NC (US) --

Item (56) References Cited, OTHER PUBLICATIONS, Column 2, Line 19:
Please correct "PCT/US2011/083814" to read -- PCT/US2011/063814 --

In the Specification

Column 23, Line 51:
Please insert a paragraph break between "shelf" and "A computer"

Signed and Sealed this
Eighth Day of December, 2020

Andrei Iancu
*Director of the United States Patent and Trademark Office*